April 19, 1966  H. B. STINSON, JR  3,247,310
MUSICAL INSTRUMENT
Filed Sept. 13, 1962  10 Sheets-Sheet 1
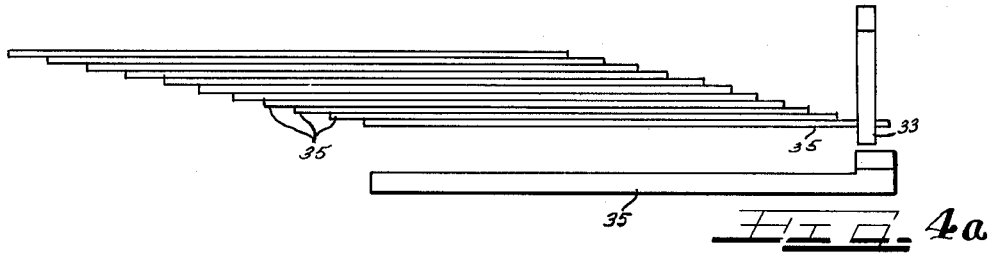
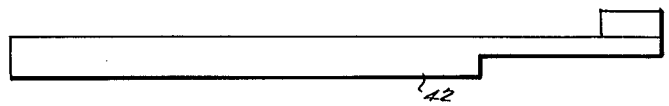
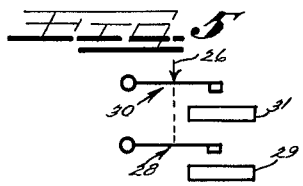
INVENTOR.
HERMAN B. STINSON JR.
BY
Hill, Sherman, Meroni, Gross & Simpson
ATTORNEYS

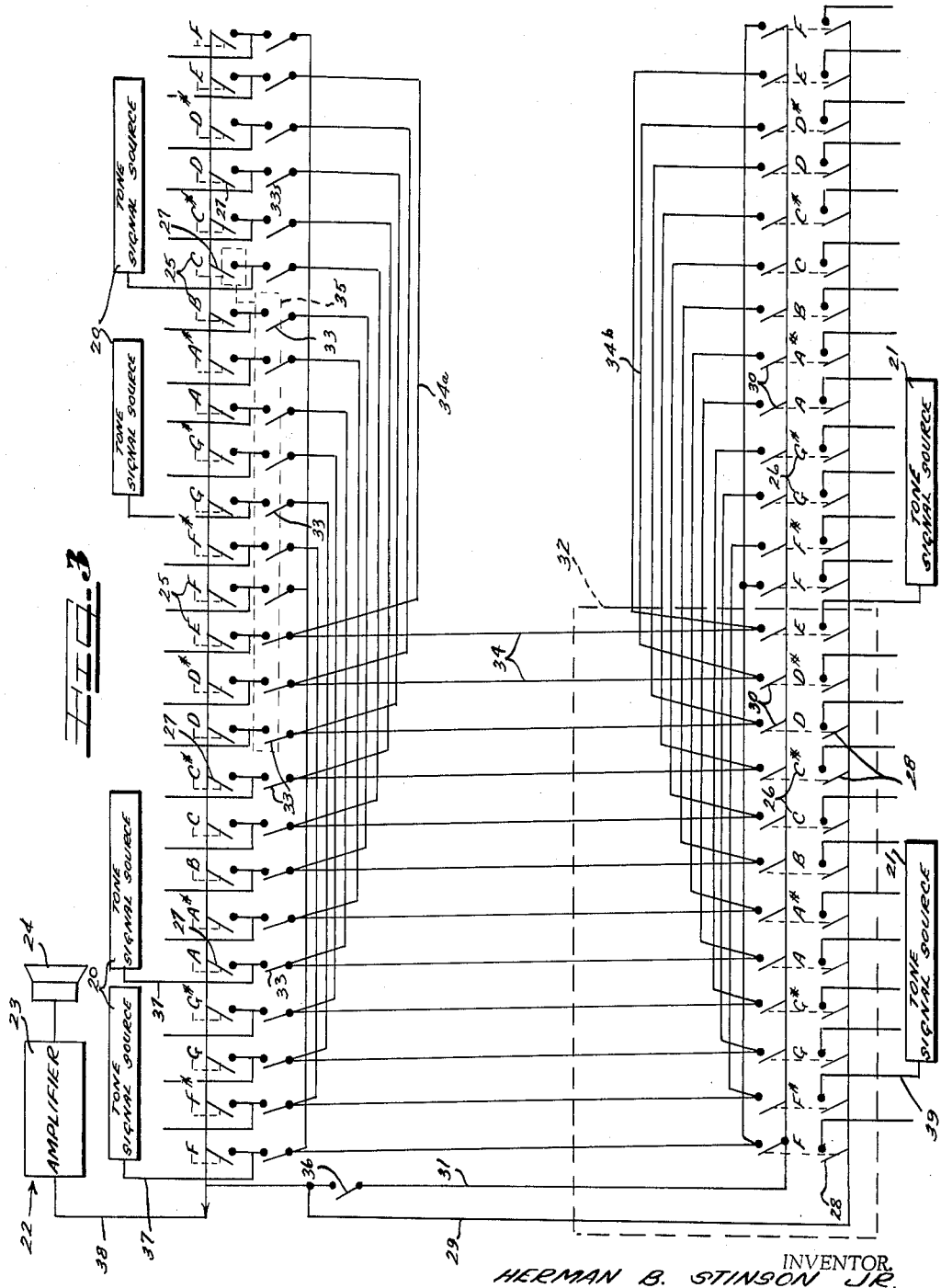

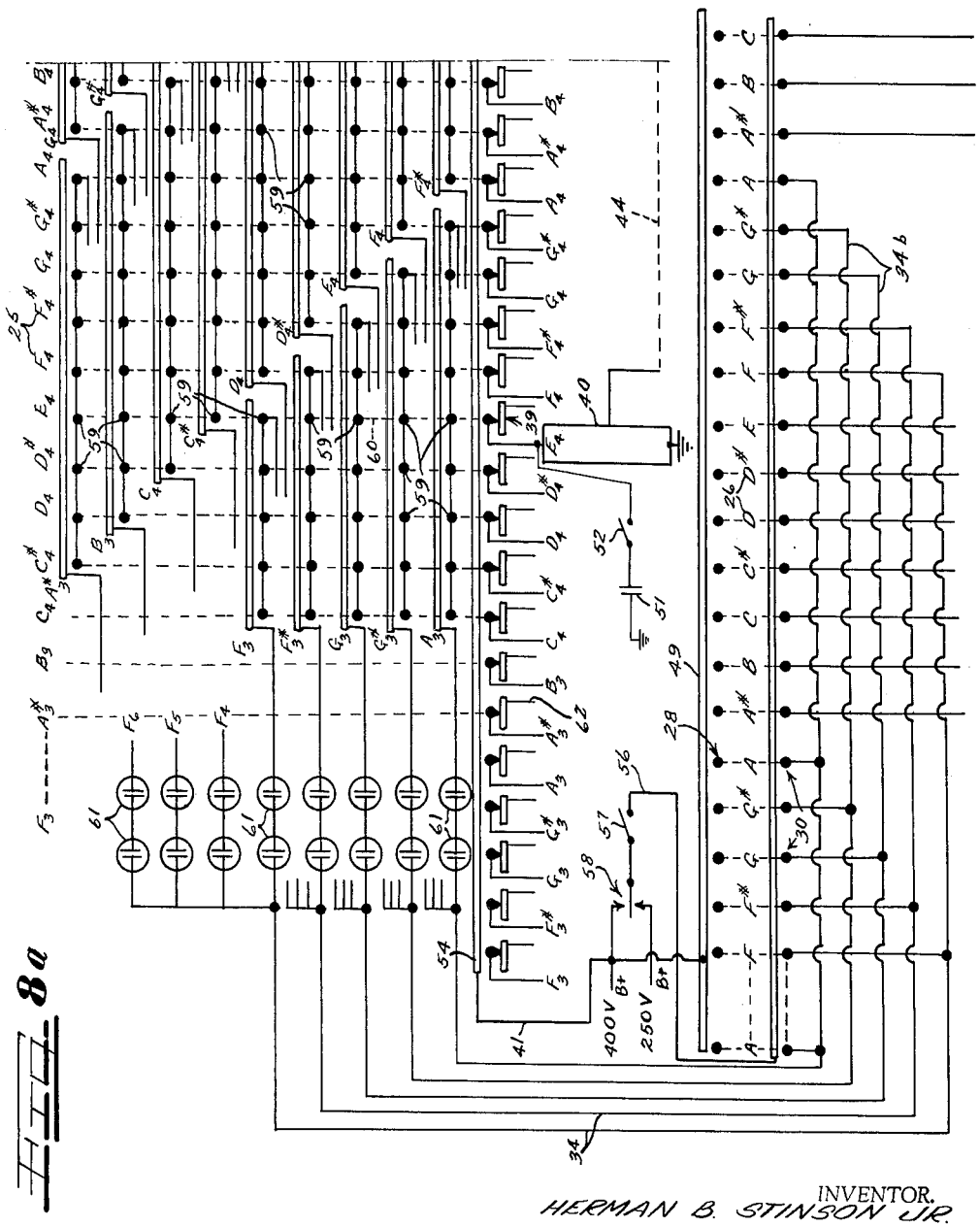

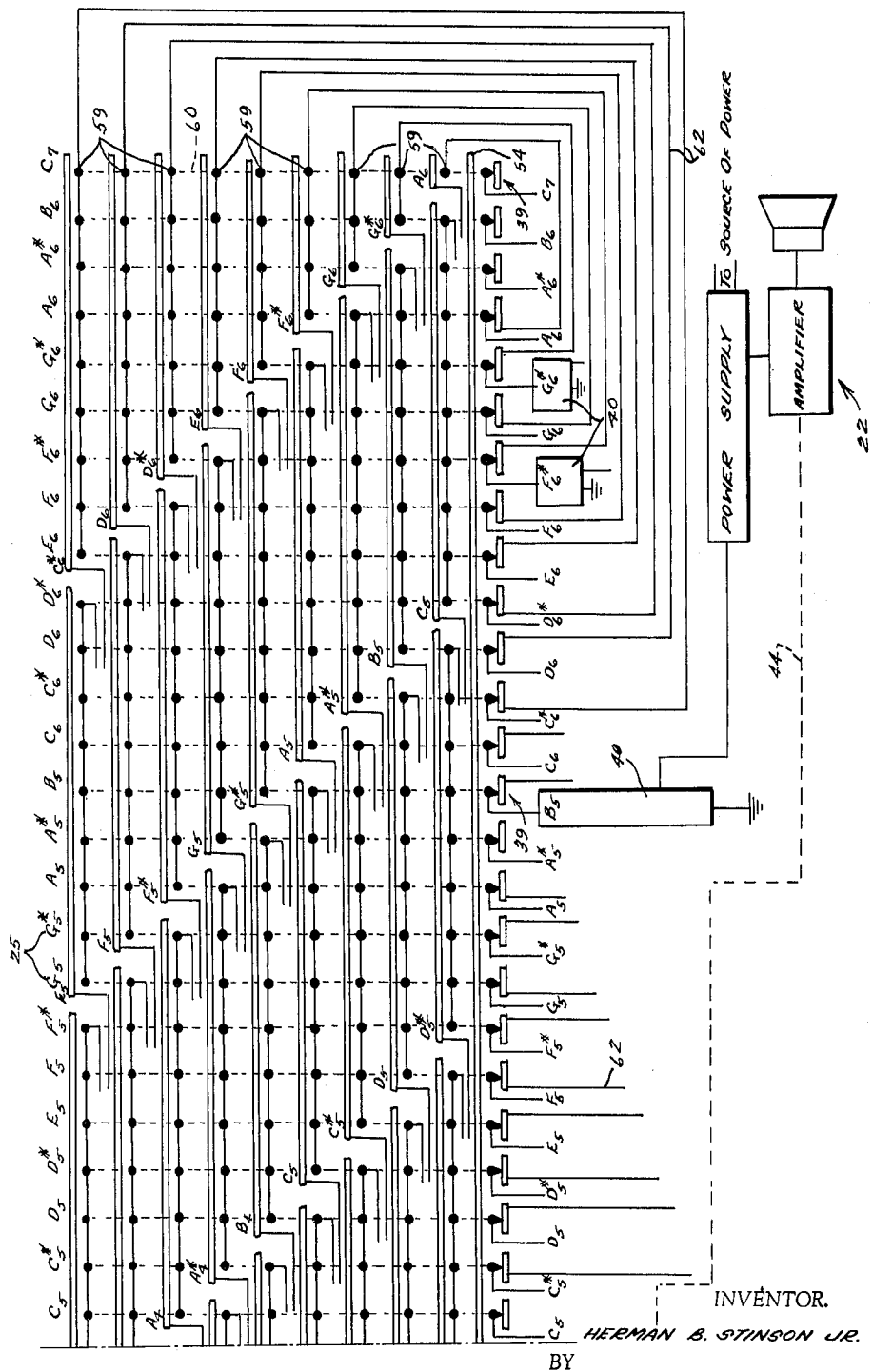

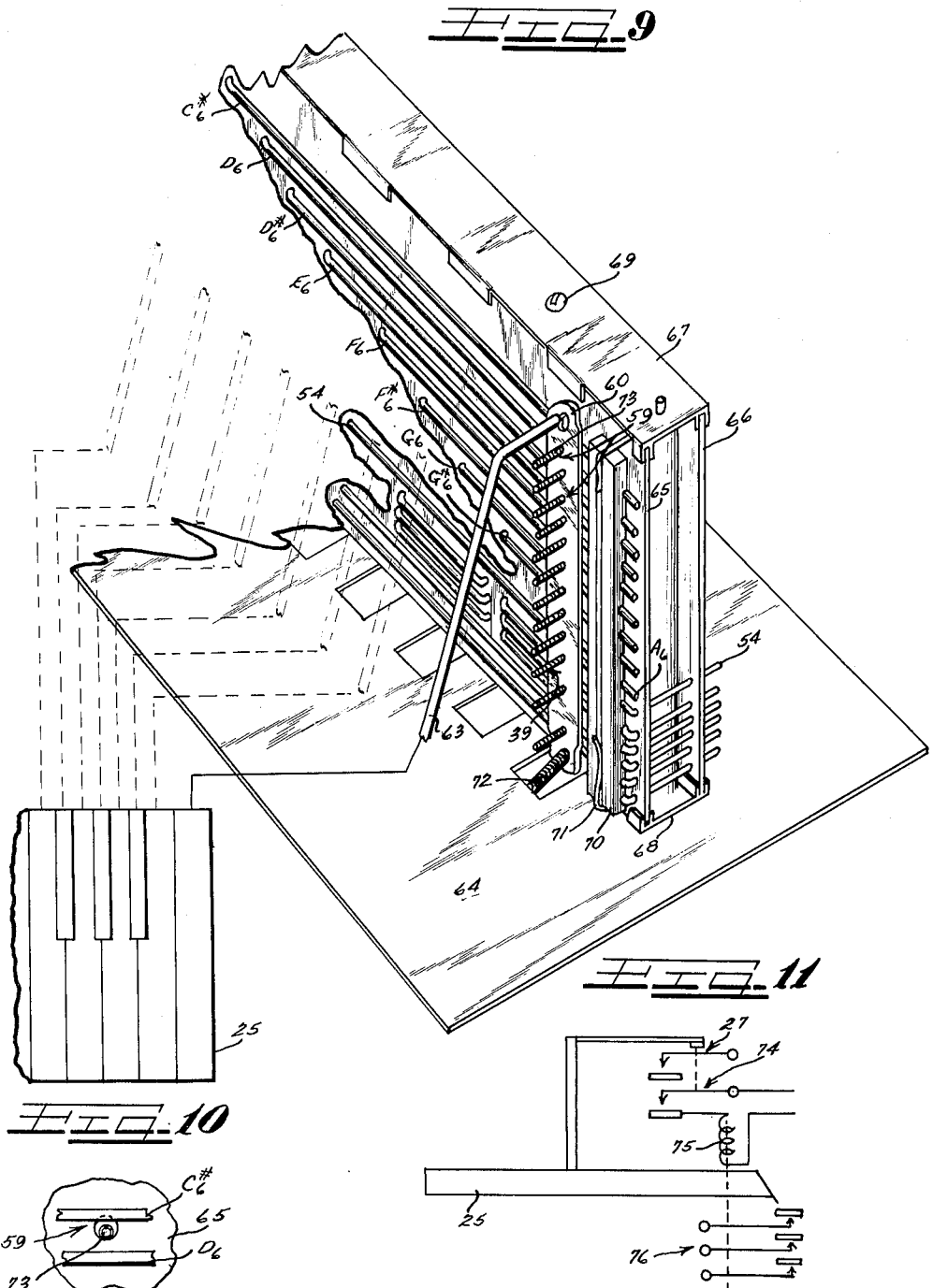

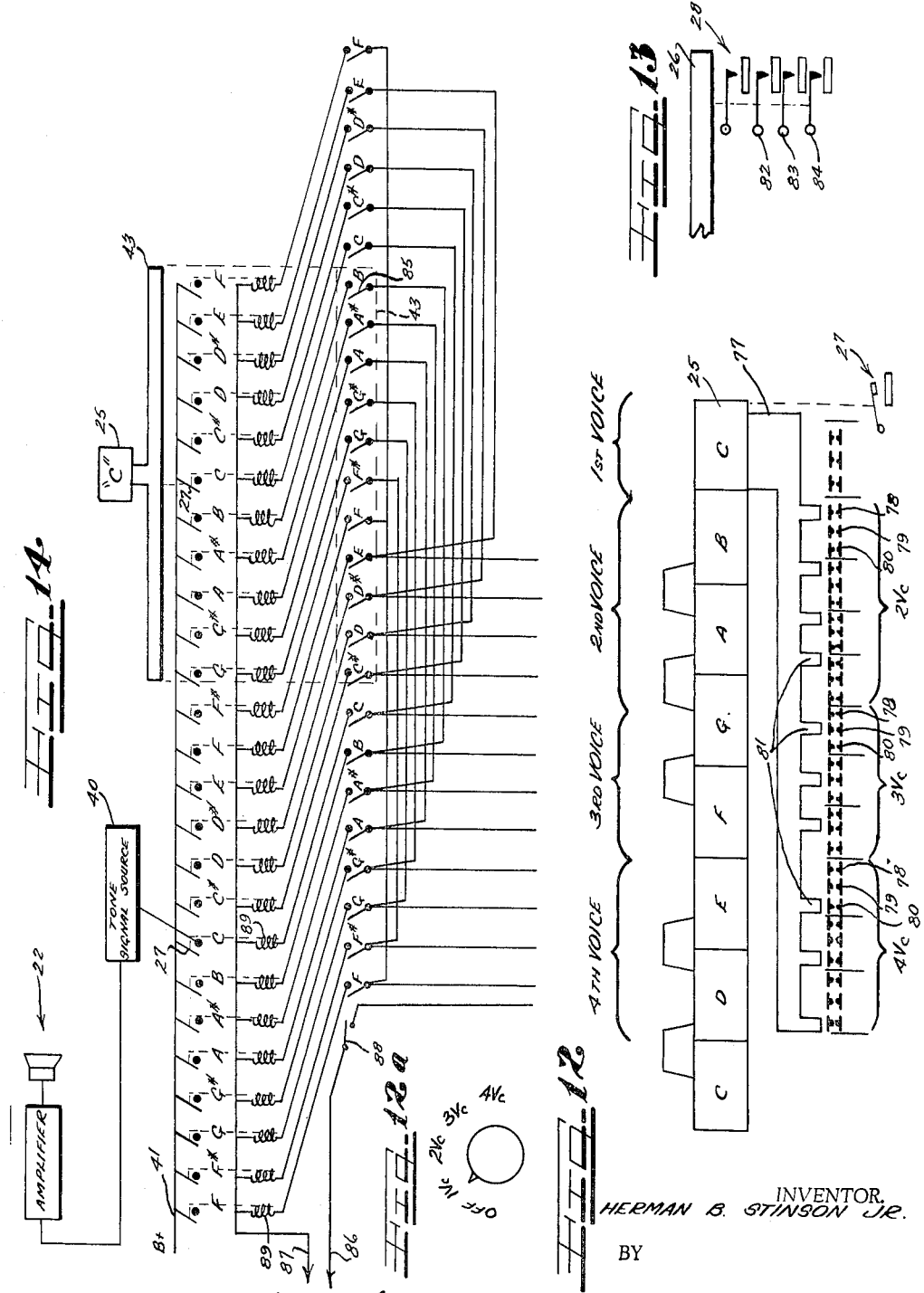

April 19, 1966  H. B. STINSON, JR  3,247,310
MUSICAL INSTRUMENT
Filed Sept. 13, 1962  10 Sheets-Sheet 8
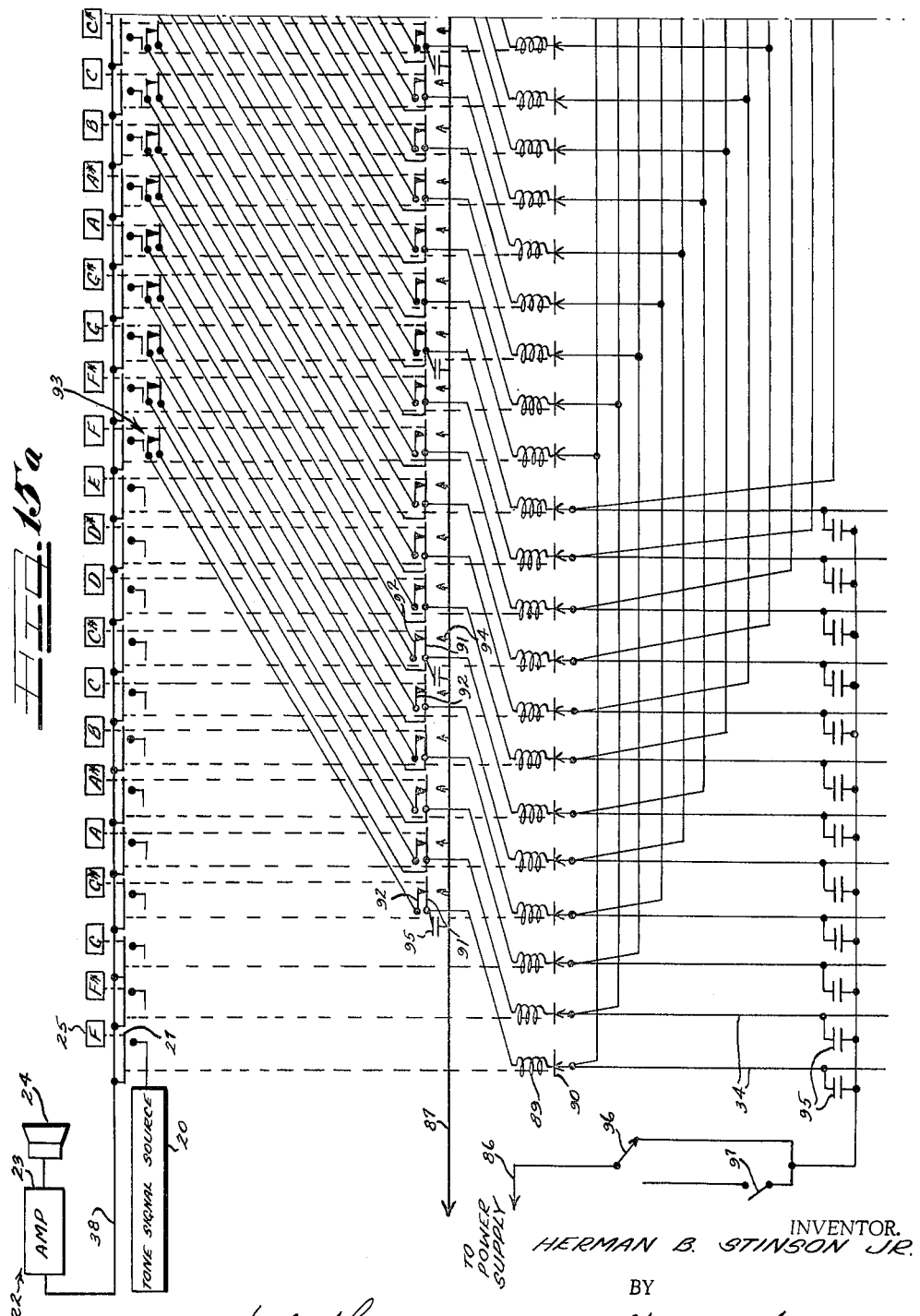
INVENTOR.
HERMAN B. STINSON JR.
BY
Hill, Sherman, Meroni, Gross & Simpson
ATTORNEYS

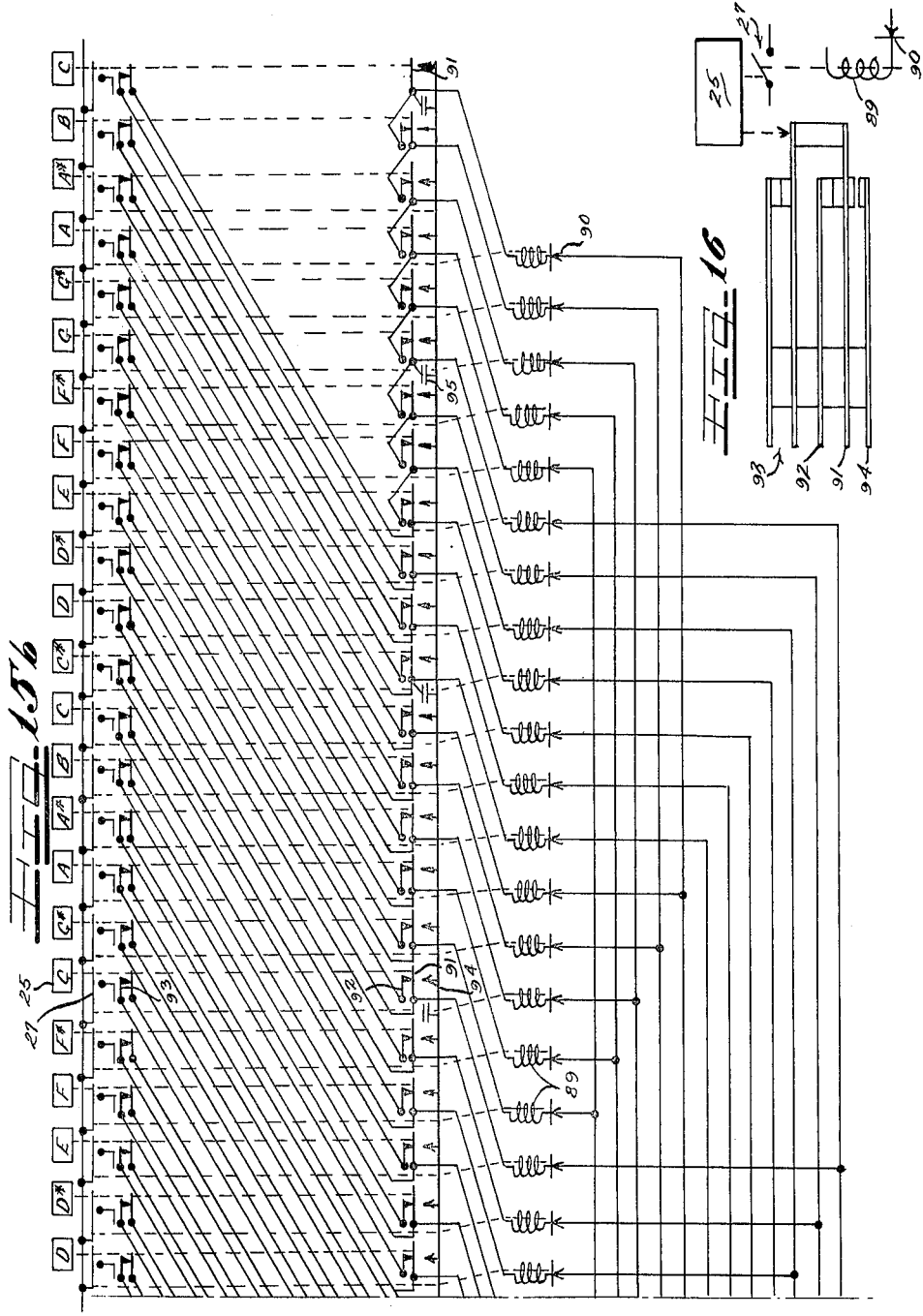

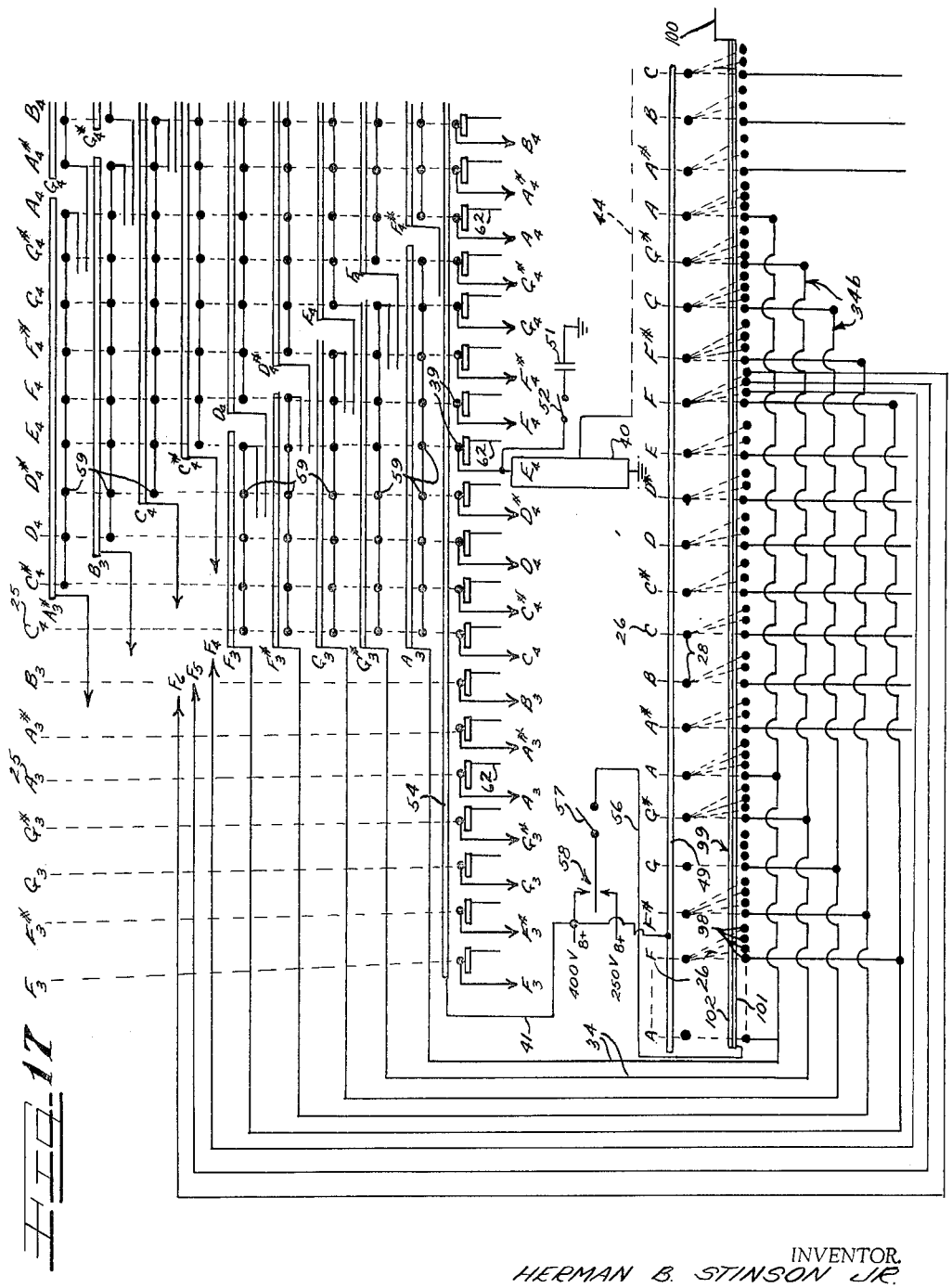

United States Patent Office
3,247,310
Patented Apr. 19, 1966

3,247,310
MUSICAL INSTRUMENT
Herman Birchard Stinson, Jr., Kirkwood, Mo., assignor, by direct and mesne assignments, to Chicago Musical Instrument Co., Lincolnwood, Ill., a corporation of Illinois
Filed Sept. 13, 1962, Ser. No. 223,465
21 Claims. (Cl. 84—1.17)

This invention relates generally to musical instruments, and more specifically to an automatic fill-in means for a solo keyboard note.

Although the principles of the present invention may be included in various musical instruments such as pianos and accordions, a particularly useful application is made in electric organs. The device of this invention may be built into the instrument at the initial manufacture thereof, or may be added thereto by subsequent modification. An instrument provided in accordance with this invention will automatically fill-in or add a treble chord when a solo treble note is played, the filled-in chord being harmonious with an accompaniment chord of any type then being played, and being pitched in the octave below the solo note than being played.

Accordingly, the primary object of this invention is to provide a method and means for automatically transferring related harmonic notes from the accompaniment keyboard of a musical instrument to its solo keyboard, and to cause these notes to sound concurrently with any single or group of notes played on the solo keyboard, and within the octave immediately below the note or notes played on the solo keyboard.

A further object of this invention is to provide means to automatically voice the related harmonic notes so transferred to the sole keyboard in a defined sequence relative to the solo note played.

A still further object of the present invention is to provide an improved musical instrument.

Many other advantages, features and additional objects of the present invention will become manifest to those versed in the art upon making reference to the detailed description and the accompanying sheets of drawings in which preferred structural embodiments incorporating the principles of the present invention are shown by way of illustrative example.

On the drawings:

FIGURES 1 and 2 comprise written music provided for illustrating the effect of this invention;

FIGURE 3 is a schematic diagram of automatic fill-in means provided in accordance with the principles of the present invention;

FIGURES 4, 4a and 5 are diagrams of structure employed in the embodiment of FIGURE 3;

FIGURE 7 is a diagrammatic illustration of a structural element employed in the embodiment of FIGURE 6;

Figure 6:
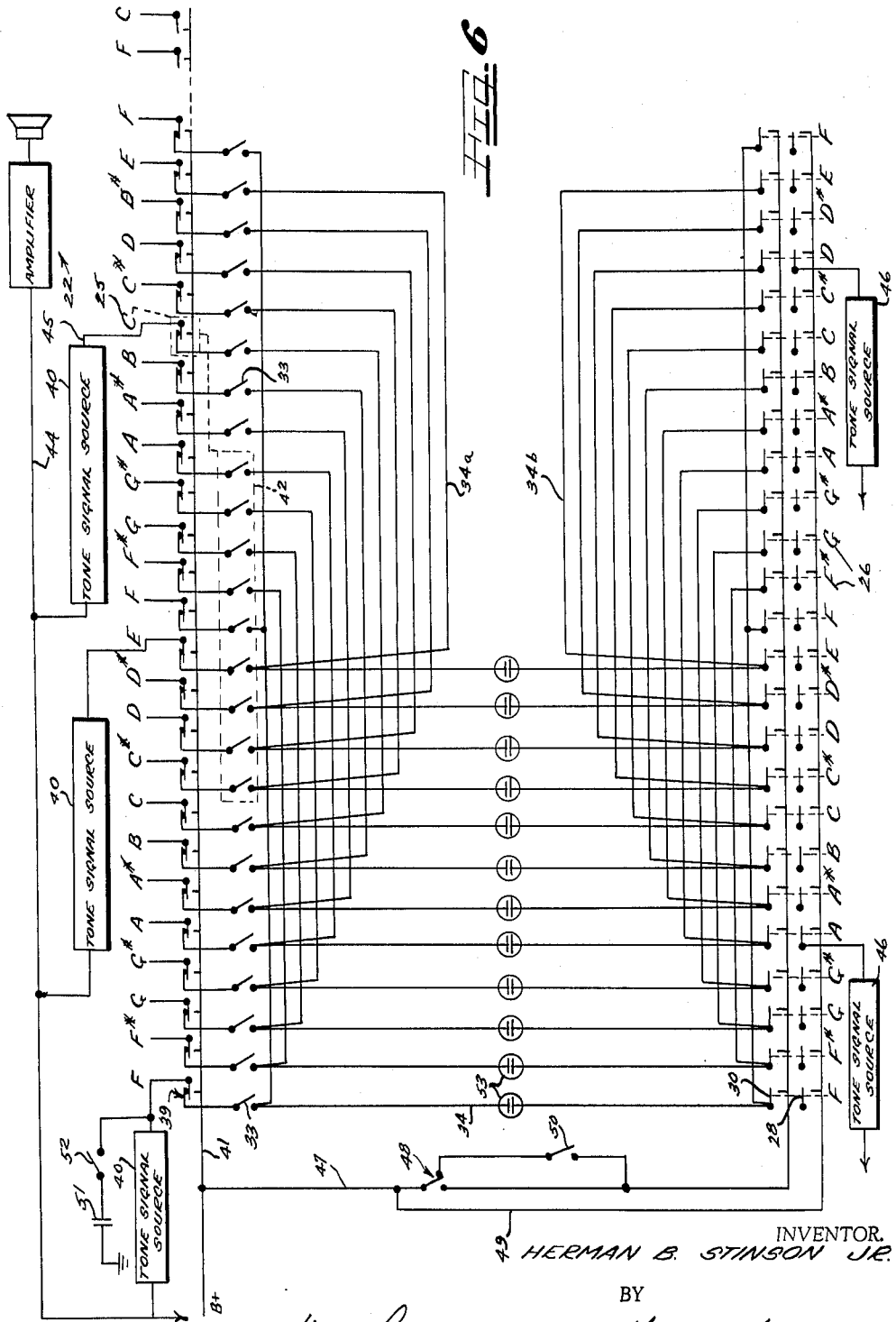
FIGURE 6 is a schematic diagram of a second embodiment of automatic fill-in means provided in accordance with the principles of the present invention.

FIGURES 8a and 8b jointly comprise a schematic diagram of a further somewhat more sophisticated embodiment of the present invention;

FIGURE 9 is a fragmentary perspective view of a key-switch structure, partly diagrammatic, and with parts broken away, illustrating structure shown at the right end of FIGURE 8b;

FIGURE 10 is an enlarged fragmentary detail of FIGURE 9, viewed in elevation;

FIGURE 11 is a schematic diagram illustrating a further mode by which key-switch structure may be attached to a key in practicing the present invention;

FIGURES 12, 12a, and 13 comprise a diagrammatic representation of a still further embodiment of the present invention;

FIGURE 14 comprises a fragmentary schematic diagram of a still further embodiment of the present invention;

FIGURES 15a and 15b comprise yet another fragmentary schematic diagram of a still further embodiment of the present invention, a structural detail thereof being shown in FIGURE 16; and FIGURE 17 is a schematic diagram of a modification of the embodiment shown in FIGURES 8a and 8b.

As shown on the drawings:

The various embodiments illustrated herein represent musical instruments which typically comprise electronic organs. It is customary for such instruments to have a solo keyboard and an accompaniment keyboard, the former of which is usually played with the right hand, while the latter of which is usually played with the left hand. Both of these keyboards may be of pianoforte type, and are usually spaced from each other, but may be contiguous as in a piano. The accompaniment keyboard may further include or may take the form of a chord button type keyboard on which predetermined chords are produced by depressing buttons, as in an accordion, or as in the chord organ, or as in an organ having a chord attachment.

When a chord organ or an accordion is played, the musician may play the melody with one finger at a time with the right hand and depress a chord button with one finger of the left hand. The musician changes the chord buttons which are depressed as the melody progresses in order to provide the proper accompaniment chords for the melody. The same result is obtained where the accompaniment keyboard is of the pianoforte type, as in a piano or in a two-manual organ (wherein the upper manual is the solo keyboard and the lower manual is the accompaniment keyboard), the accompaniment chords being formed by the musician's depressing the proper combination of notes with fingers of the left hand.

On both types of instrument described above, the average person finds it relatively easy to produce a great variety of three and four-note accompaniment chords. It is also particularly easy to produce a predetermined multinote chord by depressing a button marked with the name of that chord. With instruction and practice, it is also relatively easy for the average person to learn how to form all of the different chords on the lower manual or accompaniment keyboard. It is also relatively easy to learn how to play melodies on the solo keyboard using one finger at a time.

However, it is frequently desirable to enrich the tonality by playing notes contained in the accompaniment chord also in the right hand by adding these additional notes within the octave immediately below the melody note being played. This is a most difficult task for most people to master and one which usually requires a considerable amount of training and practice to accomplish even reasonably well.

The foregoing is illustrated by reference to FIGURES 1 and 2. Assume that music is written as shown in the upper or treble clef of FIGURE 1. The notes represent a melody played one finger at a time on the upper or solo manual. Appearing above the clef, there is a series of chord designations. These are played by depressing chord buttons with the left hand on the accompaniment keyboard, the buttons being identified, and known in musical harmony, by the indicated designations. Thus the first note is played with one finger with the right hand and the chord $C_6$ is played with the left hand by depressing a chord button having that designation. Depressing such chord button will produce a chord having the notes shown in the bass or lower clef immediately therebelow. When the instrument does not have chord buttons, the notes shown in the lower clef may be played simultaneously by the left hand.

Now assume that it is desired to fill in the treble clef with notes harmonically related or corresponding to notes played by the left hand, and located musically in the octave immediately below the note being played by the right hand, then the result obtained will be the same as that shown in FIGURE 2. It will be noted that there are a number of notes that appear below the uppermost note in the treble clef which have been added or filled-in to enrich the fullness or tonality of the music. The experienced musician is capable of adding such notes so that if music is written as shown in the top line alone of FIGURE 1, the musician will play it as shown in both clefs of FIGURE 2 when he desires to provide treble clef fill-in.

An instrument constructed in accordance with the principles of this invention will enable a musician to play the single melody note line as shown in the top clef of FIGURE 1, using either chord buttons or manual fingering of the chords as shown in the lower or bass clef of FIGURE 1, and the additional notes in the treble clef will be added automatically to provide that shown in the upper clef of FIGURE 2. Furthermore, the filled-in notes added to the treble clef in FIGURE 2 may be voiced as explained below.

There are numerous known methods and structures for producing tones on instruments, especially of the electronic or electric type, through the employment of different tone signal sources. For example, signals may be produced by frequency generators of either the vacuum tube or the transistor types, by the amplification of signals generated by rotating disks, by vibrating reeds, by prerecorded tape, and the like.

The tone signal sources, or their effectiveness or their coupling with the translating system are controlled through keying contacts, that is by key-operated switches or key-switches. It is evident that the exact manner that such keying contacts are connected into a schematic diagram for an over-all instrument will vary depending upon the nature of the source of signals. Therefore, although more than one type of connection or type of signal source has been diagrammatically illustrated herein in a general manner, it will be understood that various circuit alterations can be readily made to render the device of this invention operative when associated with each type of tone generating means. The manner of connecting key-switches into circuits for use with various types of tone signal sources is well known to those engaged in the art with which this invention is related.

The principles of this invention are particularly useful when embodied in an electrical musical instrument having automatic fill-in means such as illustrated in FIGURE 3. The instrument includes tone producing means which includes a series of tone signal sources 20, 21, each series having frequencies that jointly comprise the chromatic musical scale. The series 21 may have a different voice from the series 20, as is known in the art. The tone signal sources 20 and 21 are coupled by a suitable key-switch assembly to a translating system generally indicated at 22 which converts tone signals into audible tones, the translating system 22 including an amplifier 23 and a speaker 24.

The instrument includes a series of solo keys 25, each appearing in FIGURE 3 as a note, and a series of accompaniment keys 26, each also appearing as a note of the chromatic scale. Each of the series of keys 25 and 26 extends over one octave. Associated with each of the keys 25 and 26, there is a key-switch structure which includes a plurality of switches of the normally open type for each of the keys 25 and 26, such plurality of switches being simultaneously actuatable by the associated key. To this end, each of the solo keys 25 is mechanically coupled to a switch 27 for effecting coupling of one of the tone signal sources 20 to the translating system 22. In like manner, each of the accompaniment keys 26 is mechanically coupled to a switch 28 to effect electrical coupling of the tone signal sources 21 to the translating system 22 through a line 29.

Each of the accompaniment keys 26 is also mechanically coupled to simultaneously close the other of the plurality of switches 30. It is to be noted that one side of each of the switches 30 is connected to a common bus or line 31, and that the other side of each switch 30 is connected to all other switches 30 that are associated with a note of the same letter. If desired, only those keys 26 and switches 28 and 30 which are enclosed within a dashed line 32 may be utilized, the same thus representing a 12-note chord unit or attachment. It is evident that such structure may be provided in electrical parallel with the circuit structure illustrated.

For each one of the solo-key switches 27, there is provided another solo-key switch 33 which, when closed, respectively tentatively close circuits to the tone signal sources 20. The other side of each of the solo-key switches 33, like the accompaniment-key switches 30, are connected to other solo-key switches 33 of the same musical note, the switches 30 and the switches 33 of the same musical note being electrically connected together by a number of lines or circuits 34.

As shown diagrammatically in FIGURE 3 for one C key 25, each of the solo keys 25 is provided with an elongated actuator bar 35 which is moved in response to depression of the key 25, and when so moved, the actuator bar 35 is mechanically operative (simultaneously with the actuation of the switch 27) on the movable elements of a series of switches 33 associated with the notes such as D–B inclusive in the octave immediately below the C key which is played or depressed. FIGURE 4a is a side view of one of the actuator bars 35. The extent of its lower edge corresponds to the number of switches 33 to be closed, and its upwardly extending branch is actuated by a key as shown in FIGURE 12 for a similar actuator bar 77 described below. FIGURE 4 is a bottom view of eleven actuator bars 35 as they are arranged beneath the playing keys 25, one of the switches 33 being shown therewith. (Further variations of the actuator bar 35 are shown and described below in connection with FIGURES 7, 12, and 14.)

The line 31 is common to the various circuits which interconnect the switches 33 with the switches 30, and is provided with a switch 36 to control the completion of circuits through the switches 33 and 30 as a group.

With the switch 36 open, depressing the keys 25, or depressing the keys 26, closes the various associated switches 27 and 28 respectively to couple the tone signal sources 20 and 21 to the translating system 22 in a normal manner. While such actuation of the keys 25 and 26 will also close the switches 33 and 30, such added switch closing has no effect on the system with the switch 36 in the line 31 open.

With the switch 36 in the line 31 closed, fill-in is provided in accordance with the principles of this invention. Thus, when the C key 25 is closed as described, the actuator bar 35 closes a series of ten consecutive switches 33 whose corresponding switches 27 are open. Closing of the ten switches 33 bring their respective signal source potentials through the circuits or lines 34 to one side of the various accompaniment-key switches 30. The circuits are then completed through such of the switches 30 as are actuated by the combination of accompaniment keys 26 being played, thereby bringing the signal from corresponding tone signal sources 20 through the line 31 to the translating system 22. The simultaneous playing of both a solo key 25 and an accompaniment key 26 thus automatically produces or adds a not in the octave below the key 25, such added note corresponding to the note being played by the accompaniment key 26. When one of the solo keys 25 is played, and a chord is played on the accompaniment keys 26 (by playing several keys or by playing a chord button), a number of tone signal sources 20 in the octave below the solo key being played is coupled through the accompaniment-key switches 30 being played, to the translating system 22.

In this embodiment, the tone signal sources 20 are respectively coupled through a series of circuits 37 having a common line 38 leading to the translating system 22 for normal playing of solo notes. Likewise, the tone signal sources 21 are coupled through a series of circuits 39 which have the common portion 29 connected to the line 38 and hence to the translating system 22. The further circuits 34 connect the solo switches 33 to predetermined accompaniment switches 30 in a series manner, such accompaniment switches in this embodiment comprising switches of the same note. The further circuits 34 include circuit branches or portion 34a and 34b which respectively connect switches 33 of the same note together and switches 30 of the same note together in each key series. The circuit means 34 are thus also connected through the solo switches 33 to the solo tone signal sources 20 and to the translating system 22.

The switch actuator bar 35 shown diagrammatically in FIGURE 3 could be lengthened by one note to include the next lower C#. This appears to be unnecessary from a musical standpoint, and with some structures therefore provides an unnecessary added load or force required to actuate the key 25.

The tone signal sources 20 and 21 may represent points on a formant circuit or other known voicing structure, and may comprise sources of the type provided with a readout voltage, in which event they would be connected as shown and described below in greater detail in connection with FIGURE 6.

The structure employed for the switches 28 and 30 in the accompaniment keyboard may be arranged or constructed in the general manner indicated in FIGURE 5.

Subject to musical inversions, any musical chord may be produced on a 12-button type keyboard wherein the twelve notes comprise one octave. This can also be done on a conventional keyboard of the piano type, but to avoid musical inversions, it is preferable that the range of keys extends for more than one octave. Two octaves are usually adequate, and fill-in is not needed for the entire range of the lower or accompaniment manual.

If desired, it is to be understood that the actuator arm 35 could be lengthened or shortened to include a greater or lesser range of notes or switches which are tentatively closed by actuation of each of the solo keys.

Because of the series connection of the fill-in circuits through switches in both the solo and accompaniment keyboards, when either the solo note is terminated, or when the accompaniment chord or note is terminated, the corresponding note being filled-in is also terminated.

There are instances where the musician would key two or more notes simultaneously on the solo manual in a melody performance. A proficient organist with this skill would wish to use this technique at certain times, even where automatic chord fill-in is provided on the instrument. This invention will provide a number of interesting effects in such cases. For example, actuating two or more keys simultaneously on the solo manual will provide additional automatic fill-in extending beyond an octave below the melody note to include any key switches actuated by the extension arm associated with the lowest key which is manually actuated. If the melody is played manually in octaves, automatic fill-in is accomplished in both of the octaves immediately below each note played, resulting in 2-octave automatic fill-in. Thus 8-note chords may be produced on the solo manual.

When three or more notes are simultaneously played on the sole manual of FIGURE 3 certain automatic octave coupling may take place even if the accompaniment manual is not being played, and even if the switch 36 is open. For example, if the melody note C is played, and if in addition thereto the notes G and E therebelow are played, not only will the extension arm 35 close the switches 33 for the notes D-B inclusive, but the extension arms associated with the E and G keys will also close the switches 33 associated with the keys F#-C# inclusive immediately below those closed by the extension arm of the C key. Under this condition, the lowest G is not being played but its switch 33 is closed thereby bringing its tone signals through the associated line or circuit 34a through the switch 33 associated with the G key being played and through the corresponding switch 27 to the line 38 and translating means 22. Thus, both G's will sound. While this effect may be desirable, it may be a matter of personal preference as to whether such automatic coupling should be provided.

If the circuit of FIGURE 3 is modified to include an off-contact for each switch 27, as shown in FIGURE 6, such octave coupling is avoided. In the embodiment of FIGURE 6, each of the solo keys 25 is provided with a single-pole double-throw switch 39 which includes a movable element connected to a tone signal source 40, a normally open contact connected to a common line 41, and a normally closed or engaged contact connected to one side of the fill-in switch 33. Each solo key 25 is provided with a bar actuator 42 which closes the normally open side of the fill-in switch 33. Each sole key 25 is provided the switch 39, and closes a consecutive series of fill-in switches 33 in the octave below the solo note. In this embodiment, the actuator bar closes nine switches 33 below the solo note, not including the switch 33 for the note one octave below the solo note, and not including the played solo note or key 25. With such structure, octave coupling is omitted, as is also possible close harmony so that the two notes immediately below the played solo note will not be filled-in in response to playing of a single key 25.

The bar actuator 42 is generally L-shaped as shown in FIGURE 7, the cut-out portion of the lower edge being provided so as not to actuate the switches associated with the two notes immediately below the played solo note or key 25, and if it is desired to center the solo note with respect to the closed switches 33, the solo switches may be shifted to the left (or the fill-in switches 33 may be shifted to the right) as shown in FIGURE 14, so that a T-shaped actuator bar 43 may be employed.

In FIGURE 6, the various solo tone signal sources 40 are connected to a line 44 leading to the translating system 22, the tone signal sources 40 being of the electron coupled type which become electronically coupled to the line 44 by the presence of a coupling or readout potential applied to each input 45 thereof. In like manner, the accompaniment tone signal sources 46, when provided with a coupling potential, become activated so that they too will provide a tone signal. The accompaniment tone signal sources 46 are connected to the line 44 (connections omitted) in the same manner that the tone signal sources 40 are connected. In a common line 47, there is provided a switch 48 which controls potential to the switches 30, and which is by-passed by a line 49 leading to the accompaniment switches 28. The switch 48 is illustrated in its "off" position, and when turned on, the fill-in means is energized. In said off position a further switch 50 which may be foot-operated is operative to momentarily energize the fill-in device whenever actuated.

It is customary for instruments of the general type described herein to employ tone sustaining means whereby upon release of the normal playing key switch 39, the associated tone will continue and gradually fade out. There are numerous known structures for achieving this result, one of which is represented as a capacitor 51 connected through a control switch 52 across one of the tone signal sources 40. Whenever the tone signal source 40 is activated with the switch 52 closed, the capacitor 51 is charged, so that upon release of the switch 39, the capacitor 51 gradually discharges to sustain and diminish the tone until a cut-off level is reached. When sustain devices are included in a musical instrument of the type to be provided with a fill-in device, there is a possibility that unwanted interconnection may be obtained. With the switch 48 off, assume that a number of keys 25 and 26 are simultaneously depressed to produce a chord and to charge the sustain means for such chord. In the event that the solo keys 25 are not simultaneously released, the sustain means 51 could cause an unwanted coupling or interaction to take place through the closed switches 30. To prevent this possibility, there is provided an electronic switch or glow tube 53 in each of the lines 34, a pair of such glow tubes 53 having a combined ignition voltage which is higher than the sustain voltage produced by the means 51. It is to be understood that the electronic switches 53 may be omitted if there is no sustain means, but preferably these or equivalent means are included where sustain means are provided.

Just as the key switches of FIGURE 3 may be employed to handle readout or coupling potentials, so may the key switch means of FIGURE 6 be employed to handle tone signals. In either event, the on-off switches 36, 48, and 50 are disposed in a line common to the accompaniment fill-in switches 30 for controlling potential through such switches 30.

The operation of the embodiment in FIGURE 6 is generally the same as that of the embodiment of FIGURE 3, except that certain possible coupling is avoided. Thus the off or normally engaged contacts of the solo switches 39, connected as shown, comprise means for preventing possible octave coupling when three different notes are played simultaneously on the solo keys 25.

In FIGURES 8a and 8b there is shown a schematic diagram of a further embodiment of the instant invention. In this embodiment, automatic fill-in means are provided for an electrical musical instrument which includes the tone signal sources 40 for the solo keys 25, most of which sources 40 have been omitted from the drawing. The tone signal sources are again connected to a line 44 leading to a translating or outlet system 22. This embodiment also includes sustain means such as shown in FIGURE 6. Each tone signal source 40 is connected to the movable element of a switch 39, which movable element normally engages an "off" contact thereof. Each of the switches 39 also comprises a normally open switch, one side of the various switches being connected together in the form of a bus 54 connected by the line 41 to the source of coupling potential.

The accompaniment keys 26 are each again provided with a plurality of switches 28, 30. Each of the movable elements of the switches 28 is connected to an appropriate tone signal source 46, as explained for FIGURE 6, the movable element of each switch 28 being engageable with the common line or bus 49 as described before for the production of normal accompaniment tones. The other switch 30 of the accompaniment keys likewise is provided with a common line or bus 55 which is connected by a line 56 to an on-off switch 57, which in turn is connected to a selector switch 58 for obtaining two distinct levels of coupling potential. All like lettered accompaniment fill-in switches 30 are connected in parallel by appropriate circuits 34b as described before, the example in FIGURE 8 showing the circuits 34b for the notes F–A inclusive. The accompaniment fill-in switches 30 are connected by circuits 34 to other switches associated with each of the solo keys 25 and mechanically actuated thereby. In this embodiment, each of the solo keys 25 is provided with nine other or fill-in switches 59, each of which is normally open, each key 25 being provided with an actuator bar 60 as a means which simultaneously closes a series of the switches 59 in the octave immediately below the solo-key switch 39. This structure is duplicated for each key and is explained more fully below. The movable element of each switch 59 is engageable with a stationary contact or bus electrically common with a group of up to nine adjacent switches 59, such buses being staggered and being each identified in FIGURE 8 with the name of a certain note.

Each of the staggered buses is connected through an individual lead through a pair of neon glow tubes 61, 61 which serve as an electronic switch, the various electronic switches 61 being connected together at the other side from the buses of the notes having the same letter and leading to the lines 34. It will be appreciated that a goodly number of these has been omitted, and that the omitted elements are analogous and identical to those illustrated. Thus, all like lettered buses with their respective electronic switches are connected in parallel. Each of the off or stationary contacts of the solo-key switches 39 is connected by a line 62 to the movable contacts of the switches 59 which are associated with buses having the same designation. A representative group of these connections is shown at the right of FIGURE 8b, other similar connections having been omitted for clarity of illustration.

Actuation of the switches 39 by the solo keys 25 and the switches 28 by the accompaniment keys 26 produces normal signal coupling or music as described before. However, with the switch 57 closed, and with the selector switch 58 in either on position, such simultaneous actuation of both the solo key 25 and an accompaniment key 26 also effects fill-in of notes below the solo key played as previously described. Assume that the key $C_7$ is depressed or actuated. This connects the tone signal source at $C_7$ to the bus 54 which activates such tone signal source. Also, depressing the key $C_7$ simultaneously closes the nine switches 59 which are associated therewith. Now when accompaniment keys 26 are simultaneously depressed, a selected potential is brought from the bus 55 to such of the lines 34 as have corresponding keys 26 depressed. This brings the coupling potential up to and ignites those of the 82 electronic switches 61 which are connected to staggered buses having letters corresponding to the depressed accompaniment keys 26 thereby applying the potential to such corresponding buses, whereby the potential passes through the appropriate closed switches 59 and their corresponding lines 62 to the off or stationary contacts of the solo-key switches 39, whereby such potential is applied to the corresponding tone signal sources 40. Thus again the simultaneous playing of both a solo key 25 and an accompaniment key 26 automatically produces an added note, corresponding in letter to the note played on the accompaniment key 26, but pitched in the octave below the note played on the solo key 25. Again the off contacts or normally closed solo switches comprise means for preventing coupling through the interconnecting circuitry, when open, thereby preventing possible octave coupling when three different notes are played simultaneously on the solo keys.

In this circuit, if the 82 electronic switches 61 were omitted, or jumpered, there would be a possibility when sustain means are employed, and when keys are not released simultaneously, that some coupling could arise due to a coupling potential passing from one of the buses, such as $F_3$, through the common connection point to another of the F buses. This possibility is precluded by the provision of the disclosed electronic switches 61. In ordinary operation, glow tubes 61 may be employed which have a 70-volt ignition potential. Once ignited, two such glow tubes in series would have a voltage drop of 120 volts which reduces the coupling potential by that amount. However, for the described interconnection between two buses of the same letter, the potential would have to flow through four of such electronic switches which collectively thus have an ignition potential of 280 volts typically, a voltage level which is somewhat in excess of that which the sustain means could provide. Thus, the glow tubes 61 effectively prevent any such inadvertent coupling. The requisite isolation may be provided without such glow tubes as described below in connection with FIGURE 17.

If the selector switch 58 is set at the higher coupling voltage position, normal audibility will be provided as to the notes filled-in below the played solo note. On the other hand, if the selector switch 58 is set to a lower value of coupling potential, a selected or lower coupling potential will appear on the tone signal sources 40 which are to be filled-in, thereby coupling them more softly, namely more like background tones. The selectable level of coupling potential referred to and the selectable level of audibility of the filled-in notes is relative to the solo and accompaniment notes, since the over-all volume may be regulated by conventional means (not shown) which form a part of the translating system 22.

Referring to FIGURE 9, there is shown a fragmentary perspective view of the structure of FIGURE 8, with parts omitted. Each of the keys 25 of the solo keyboard is mechanically coupled to the nylon actuator bar 60 through an arm 63. A base plate 64 supports a front or bus bar board 65 and a rear or terminal board 66, both boards 65 and 66 comprising insulative material. An upper board spacer 67 and a lower board spacer 68 hold the insulative boards 65 and 66 to the base plate 64, an appropriate number of screws 69 extending therethrough. On the front face of the bus bar board 65 there is disposed a number of bus bars which are rigidly held in place by a number of bus bar spacers, only one of which is illustrated at 70 which is held against the front face of the bus bar board 65 by an encircling spring clip 71. A number of bus bar spacers 70 is provided so that the ends of the various bus bars are accurately located, the bus bar spacers preferably comprising nylon or any equivalent material. Each bus bar comprises silver plated phosphor bronze wire, and each is engaged by a movable switch element which comprises a helical spring anchored in the terminal board 66. An actuator spring 72 is supported at its ends by the base plate 64 and extends upwardly through an aperture therein and through the lower end of the actuator 60, the spring 72 thus tensioning the actuator 60 in a downward direction. The actuator 60 in turn deflects each of the movable elements in a downward direction, so that when the solo key 25 is actuated, the actuator 60 is raised against the force of the spring 72, thereby raising the various movable elements of the switches 59. The uppermost movable element is illustrated at 73 in FIGURE 10 wherein it passes through an aperture in the bus bar board 65, the C#6 bus bar spanning the upper part of such aperture as shown. In this embodiment, there are twelve such apertures per note and forty-four notes so that there are 528 such apertures provided in the bus bar board 65, together with other apertures for making connections to the bus bars. In FIGURE 9, the upper nine movable elements correspond to the nine switches 59 shown in FIGURE 8, and the tenth such element forms a part of the switch 39. The other lower movable switch elements are used for other organ purposes not forming a part of this invention.

Space requirements will not always enable the usage of a key-switch assembly such as shown in FIGURES 8 and 9. Under such circumstances, as shown in FIGURE 11, each solo key 25 may be constructed to mechanically close a solo-key switch 27 and another switch 74 simultaneously, the switch 74 comprising part of a circuit to an operating solenoid 75 which mechanically actuates a stack-switch 76 having a number of switches, such as nine, connected as are the switches 59 in FIGURE 8.

The circuitry involving the key-switch structure for the accompaniment keys 26 in each of the embodiments shown in FIGURES 3, 6, 8, 14, and 15 is identical. The actual switch elements may be constructed as shown in FIGURE 5, and may also be constructed in the form of deflectable springs and bus bars as shown in FIGURE 9. However, a different structure is employed in the species of FIGURES 12–13 and in the species of FIGURE 17. It has been pointed out above that the tone signal sources 20 could have a different voicing than the tone signal sources 21. Similarly, the tone signal sources 40 may have a different voicing from the tone signals 46. In such examples, the voicing of the tone signal sources for the accompaniment keys 26 has been the same for the entire keyboard. In the species shown in FIGURES 12, 12a, and 13, several different voice are employed. To expain this point in greater detail, assuming that the translating system or generators are set to provide a violin-like tone, the tone of each note filled in on the solo keyboard will also be a violin-like tone or voice so that the effect is that of three or four violins playing together in harmony. By providing different voicing for the various notes which are filled in, a string quartet type of sound is produced which includes a first violin, a second violin, a viola, and a cello. If a vox humana type of stop be used with the embodiment of FIGURE 12, the solo voice would be equivalent to a soprano, and the filled-in notes would be equivalent to alto, tenor, and bass. Many interesting musical effects or results can thus be obtained.

Referring to FIGURE 12, each key 25 is provided with an actuating bar or means 77 which closes a series of fill-in switches in the octave immediately below the played key 25, doing so simultaneously. The key 25 plays a solo note as described before which comprises the first or solo voice, represented in FIGURE 12 by the switch 27 as explained before. However, for each of the ten notes below the played key, instead of there being one fill-in switch such as 33, there are three solo-key fill-in switches 78, 79, and 80. The actuator bar 77 has various engaging portions 81 which are so spaced that the upper four engage and close fill-in switches 78 for the first four notes below the played key. The next three engage fill-in switches 79 for the next three notes or keys, and the last three engage switches 80. In this embodiment, independent tone signal sources (not shown) are connected to the switches 78, other independent tone signal sources are connected to the switches 79, and a third group of tone signal sources is connected to the switches 80. Each of these independent tone signal sources is voiced as may be desired to obtain the quartet-effect described above. Preferably, any given stop or voice which is available is provided with a multiposition selector switch such as is shown diagrammatically in FIGURE 12a, so that instead of a conventional on-off tab switch, the voice, which may be violin, is controlled by the setting of the knob. In the off position, such voice does not appear at all, and in the other knob settings, that voicing is directed to the switches 27, the switches 78, the switches 79, or the switches 80 as may be desired. Since there is a knob such as shown in FIGURE 12a for every voice available on the instrument, many unusual quartet combinations can be assembled by setting the various knobs appropriately. In the accompaniment manual of this embodiment the switch 28 is provided as before, but instead of one switch 30, there are three accompaniment fill-in switches 82, 83, and 84 each connected to control one voice. It is evident that the switches 78 plus one of the switches 82–84 are connected together, for example in the manner shown in FIGURE 3, which circuitry is repeated for the switches 79 and which is again repeated for the switches 80.

The suggested protrusions 81 on the actuator bar 77 provide optimum voicing of the various harmonic combinations commonly used with a given melody note. With the suggested grouping or arrangement, for all the common three and four-note chords, only one note will fall within each of the designated voices.

Referring to FIGURE 14 there is shown a further embodiment of the instant invention. In this embodiment, the fill-in switches 85 for the solo keyboard are shifted to the right so that the playing key 25 may be disposed centrally of the actuator bar 43. Each playing key 25 closes the corresponding solo switch 27 as described before, and thus also closes a series of the fill-in switches 85 in the octave immediately below the played or closed switch 27, doing so simultaneously. In this embodiment, power, such as direct current, is brought into a pair of inputs 86, 87, the input 86 being connected to a line having a switch 88 for controlling a potential through the accompaniment fill-in switches as described before. The input or terminal 87 is connected to one side of a series of solenoids 89 so that when a series of the switches 85 in the octave below the played key are closed, and an accompaniment chord is played to close the corresponding accompaniment switches (such as 30), power is brought to the corresponding solenoids 89 which have mechanical connections with the switches 27 to close the same, thereby coupling the corresponding tone signal sources 40 to the translating means 22. Therefore, each of the circuits connecting the various fill-in switches includes a solenoid actuator to effect activation of the tone signal sources 40. The type of fill-in means shown in FIGURE 14 which includes the solenoids 89 is particularly advantageous where a considerable force is necessary to activate the normal tone producing means. For example, if a conventional piano action were substituted for the tone producing means 27, 40, the various solenoids 89 would operate to activate the same as already described.

Referring to FIGURES 15a and 15b which jointly comprise FIGURE 15, there is shown a further embodiment of the instant invention. In this embodiment, in place of actuator bars, there are a number of stackswitches employed to limit or delineate or isolate a consecutive group of solenoids which can be energized in the octave immediately below the played solo key. The solo keys 25 respectively operate switches 27 to selectively connect tone signal sources 20 to a line 38 leading to a translating system 22 consisting of an amplifier 23 and a speaker 24 and other conventional components as described before. As is the case with the embodiment of FIGURE 14, there is provided a number of the solenoids 89 each of which is mechanically coupled to the movable element of the switch 27, as in FIGURE 14, or to the other tone activating instrumentality. One side of each of the solenoid actuators 89 is provided with a rectifier or diode 90 for limiting the direction of current flow through the coil of the solenoid to one direction, thereby preventing improper coupling. The other side of the coil of the solenoid 89 is connected to the movable element 91 of a normally closed switch whose engaged contact 92 is connected through a normally closed switch 93 to the movable element 91 of the next higher note. Each such movable element 91 is under the mechanical control of a key 25 located three notes higher than the key or note with which each solenoid 89 is associated. The normally closed switch 93 to which a movable element 91 is connected is under the mechanical control of a key 25 located or pitched a further eight notes higher. Stated otherwise, each key 25 not only controls the normal tone producing means, such as the switch 27, associated therewith, but also controls the movable element 91 associated with the solenoid which is associated with the note which is three notes below the played key, and also actuates the normally closed switch 93 which leads to the contact 92 having the movable element 91 connected to the solenoid 89 which is associated with the tone producing means pitched one octave below the played key. Each of the movable elements 91 is further engageable with a normally open contact 94, all the contacts 94 being connected together and to the power terminal 87. Because of the inductive nature of the solenoids 89, for arc suppression purposes there is provided a number of arc suppression capacitors 95, one being connected across each of the circuits 34 and the power supply 86, and hence across each of the accompaniment-key fill-in switches. A further one is provided across the movable element 91 and the stationary contact 94 for every fifth or sixth movable element 91.

The instrument may be played normally or with the automatic chord fill-in operative as the musician chooses, and to that end there is provided an on-off control switch 96 shown in the on position, the switch 96 being in a line common to the various fill-in circuits for controlling potential through the switch means 91–94. There is further included a switch 97 which is normally open, and which is closed by a spring-loaded lever located on the expression foot pedal of the instrument. When the switch 96 is in the off position, the circuit from the terminal 86 is closed down to the normally open foot-operated switch 97. The musician may then utilize the automatic chord fill-in on a single note or short passage at will, simply by sliding his right foot against the lever located on the expression pedal, the lever in effect being the movable element of the switch 97.

The solenoids 89 and the switch means 91–94 comprise means associated with each solo key 25 for closing a series of switches 91, 94 in the octave immediately below the played solo key 25. As each solenoid 89 is energized, it couples the corresponding tone signal source 20 to the translating system 22, such added tone signal sources being in the octave below the solo key which is played, and such coupling being dependent upon the playing of a corresponding accompaniment key. Each of the lines 34 which is in series with one of the accompaniment fill-in switches as explained above comprises part of a circuit in which predetermined solo fill-in switches 91, 94 are connected in series.

The switches 91, 92 and the switches 93 are all normally closed and are wired alternately in series beginning at the left in FIGURE 15a with the element 92 for the note G♯, thence through a switch 93 for the note F, and back to the movable element 91 of the next succeeding switch 91, 92. This type of connection continues serially to include all of the switches 93. From this point and upwards, the switch elements 91, 92 are wired consecutively in series. This provides a continuous circuit between the lowermost element 91 and the uppermost element 91, each element 91 being connected to one side of a solenoid disposed three notes below such element.

When a key 25 is depressed, in addition to activating or closing the switch 27 causing the corresponding solo note to sound, the associated switches 91–94 are also actuated. Opening of the switch 93 breaks the continuous circuit isolating all the solenoids beginning with the one located an octave below the played key, and lower. Opening the contacts 91, 92 isolates all the solenoids beginning with the one associated with the key two notes below the played key, and upwards. Simultaneous closing of the contacts 91, 94 ties or connects one side of nine solenoids that are still connected together, to the line 87 so that each will close provided that the corresponding accompaniment fill-in switch is closed to bring power through the circuits 34 to such solenoids 90. Thus the circuits are disposed in parallel across the power leads 86, 87, through an accompaniment-key switch 30, through the diode 90 to one side of the solenoid actuator 89, and from the other side of the solenoid actuator 89 through lines serially connected with each other, such lines including predetermined musically spaced pairs of solo-key switches 91–94 for each key 25 which are normally closed, and which when opened, simultaneously isolate ends of a series of solenoid actuators in the octave below the solo key and connect said other sides of such solenoid actuators as a group to the power lead 87. Thus, each such circuit has a pair of solo-key switches 91, 92 and 93, one of those switches 91, 92 of one pair, and the other of those switches 93 of another pair being under the mechanical control of each solo key 25.

FIGURE 16 shows a stackswitch structure embodying the switches 91–94.

As described above, the embodiment in FIGURE 8 includes 41 bus bars each connected through a pair of electronic switches 61 and thence together with other lines of the same letter or note so that twelve lines 34 extend to the accompaniment section where all of the fill-in switches of the same note are connected in parallel with each other and to one of the lines 34.

In FIGURE 17 there is shown a modification of the structure of FIGURE 8 wherein the isolating means or electronic switches 61 have been eliminated and other isolating means have been provided. In place of the lines being connected together to a common point as in FIGURE 8, the lines from the bus bars extend as a total of 41 lines 34 to the accompaniment section. In place of single accompaniment or intelligence switches 30 connected together in parallel between one of the lines 34 and the bus 55, there are provided three or four independent switches 98 for each of the accompaniment keys 26, which switches 98 include in common a relatively movable bus 99, each switch 98 being connected to appropriate lines 34 leading from the various bus bars in the solo key-switch assembly. With sustain means energized, even with no voltage on the bus 99, the switches 98 could couple sustain voltages from one or more solo tone signal sources to other solo tone signal sources to provide thereby an undesirable or unwanted transient false note. This condition is avoided by the use of the isolating means or electronic switches 61 in FIGURE 8, and is avoided in the FIGURE 17 structure by thhe relative movability of the bus bar 99. In this embodiment, the bus bar 99 may be left continually energized and shifted relatively to the movable elements of the switches 98 to an inoperative position. Thus the on-off switch for the fill-in means of this embodiment may comprise a manual tab-operated crank 100 for effecting rotation thereof. The bus bar 99 is constructed to have a conducting side 101 and an insulative side 102. Thus, when various switches 98 are closed against the insulative side 102, they are not connected together and the circuits are therefore isolated from each other, even when the keys are depressed. Such relative movement may also comprise a lateral displacement of the bus bar 99 or a lateral displacement of the movable elements of the switches 98 to increase the spacing therebetween so that actuation of such switches will not enable the movable elements thereof to engage the conducting portion 101 of the bus bar 99.

For simplicity of illustration, only the lines 34 for the bus bars $F_2$, $F_3$ and $F_4$ have been added in FIGURE 17 to the structure shown in FIGURE 8. However, it is to be understood that corresponding lines are included for each of the other staggered bus bars of the solo key-switch assembly.

The uppermost notes of the solo manual are not often used, and therefore it is not uncommon to omit separate tone signal sources 40 for them, connecting such keys to the corresponding tone signal sources which are pitched one octave lower. If this be done, the uppermost bus bars may also be connected in parallel with bus bars designated one octave lower. By so doing, the total number of lines 34 may be reduced from forty-one to thirty-six.

The invention herein described also includes the method for filling in musical notes below the solo note, such method including tentatively activating means for producing a consecutive series of notes located musically in the octave below a solo note, in response to playing of a solo key, coupled with the further step of completing the activation, either before or after the other step, to those of such means as have a predetermined or corresponding note being played on the accompaniment keys in response to the playing of such accompaniment keys.

Although various minor modifications might be suggested by those versed in the art, it should be understood that I wish to embody within the scope of the patent warranted hereon all such embodiments as reasonably and properly come within thhe scope of my contribution to the art.

I claim as my invention:

1. An electrical musical instrument comprising in combination:
    (a) a series of tone signal sources having frequencies comprising a chromatic musical scale;
    (b) a translating system for converting tone signals into audible tones;
    (c) a series of solo keys and a series of accompaniment keys;
    (d) a plurality of switches for each of said keys, and simultaneously actuatable by the associated key;
    (e) a series of circuits respectively operative to couple said tone signal sources to said translating system by means of one of said plurality of switches, for producing an audible tone in response to actuation of the associated key; and
    (f) a further series of circuits respectively interconnecting the other of said plurality of switches of the same-named musical notes, and operative to couple said tone signal sources to said translating system in a manner that simultaneous closing of said other switches in one circuit by actuation of both one solo and one accompaniment key will effect production of the tone signal related to said closed other switch of the solo key, such solo keys individually having means to close a series of said other switches in the octave immediately below each such solo key.

2. An electrical musical instrument comprising in combination:
    (a) a series of tone signal sources having frequencies comprising a chromatic musical scale;
    (b) a translating system for converting tone signals into audible tones;
    (c) a series of solo keys and a series of accompaniment keys;
    (d) a plurality of switches for each of said keys, and simultaneously actuatable by the associated key;
    (e) a series of circuits respectively operative to couple said tone signal sources to said translating system by means of one of said plurality of switches, for producing an audible tone in response to actuation of the associated key;
    (f) a further series of circuits respectively connecting in electrical series the other of said plurality of switches of the accompaniment keys with the other of said plurality of switches of the solo keys;
    (g) circuit means respectively coupling said further series of circuits to said signal sources for effecting operative coupling thereof to said translating system; and
    (h) means, under the control of individual keys of a series of solo keys, operative to close a series of said other switches in the octave immediately below each such solo key.

3. Automatic fill-in means for a musical instrument having a series of jointly audible chromatic tone producing means activated by a series of solo keys and by a series of accompaniment keys, at least one of said series of keys extending for more than one octave, comprising:
    (a) a series of switches respectively associated with each of said keys and actuatable thereby;
    (b) a series of circuits respectively connecting together said key switches of said one series of keys which are related to the same-named musical notes, said series of circuits respectively connecting the solo-key switches in electrical series with predetermined accompaniment-key switches, and respectively adapted to be connected in activating relation to said tone producing means; and
    (c) means adapted to be actuated by each of the solo keys for simultaneously closing a series of said solo-key switches in the octave below each said solo key;

whereby the simultaneous playing of both a solo key and an accompaniment key will automatically produce an added note, corresponding to the note played on the accompaniment key, in the octave below the note played on the solo key.

4. Automatic fill-in means for a musical instrument having a series of jointly audible chromatic tone producing means activated by solo keys and by accompaniment keys, comprising:
   (a) a series of switches respectively associated with each of said keys and actuatable thereby;
   (b) a series of circuits respectively connecting the solo-key switches in electrical series with predetermined accompaniment-key switches, and respectively adapted to be connected in activating relation to said tone producing means;
   (c) means adapted to be actuated by each of the solo keys for simultaneously closing a series of said solo-key switches in the octave below each said solo key; and
   (d) a line common to all of said series of circuits and having a switch therein for controlling the delivery of electrical potential through said key switches.

5. An electrical musical instrument comprising in combination:
   (a) a series of tone signal sources having frequencies comprising a chromatic musical scale;
   (b) a translating system for converting tone signals into audible tones;
   (c) a series of solo keys and a series of accompaniment keys corresponding to notes of the musical scale;
   (d) a series of switches respectively associated with each of said keys and actuatable thereby;
   (e) a series of circuits respectively connecting the solo-key switches in electrical series with predetermined accompaniment-key switches and in coupling-effecting relation to one of said tone signal sources and said translating system; and
   (f) means actuated by each of said solo keys for simultaneously closing a series of said solo-key switches in the octave immediately below each said solo key;
   whereby the simultaneous playing of both a solo key and an accompaniment key will automatically produce an added tone, corresponding to the tone played on the accompaniment key, in the octave below the tone played on the solo key.

6. An electrical musical instrument comprising in combination:
   (a) a series of tone signal sources having frequencies comprising a chromatic musical scale;
   (b) a translating system for converting tone signals into audible tones;
   (c) a series of solo keys and a series of accompaniment keys;
   (d) a plurality of switches for each of said keys, and simultaneously actuatable by the associated key;
   (e) a series of circuits respectively operative to couple said tone signal sources to said translating system by means of one of said plurality of switches, for producing an audible tone in response to actuation of the associated key, each of said ones of said switches for said solo keys having means to prevent possible octave coupling when three different notes are played simultaneously on said solo keys; and
   (f) a further series of circuits respectively interconnecting the other of said plurality of switches of the same named musical notes, and operative to couple said tone signal sources to said translating system in a manner that simultaneous closing of said other switches in one circuit by actuation of both one solo and one accompaniment key will effect production of the tone signal related to said closed other switch of the solo key, such solo keys individually having means to close a series of said other switches in the octave immediately below each such solo key.

7. An electrical musical instrument comprising in combination:
   (a) a series of tone signal sources having frequencies comprising a chromatic musical scale;
   (b) a translating system for converting tone signals into audible tones;
   (c) a series of solo keys and a series of accompaniment keys;
   (d) a plurality of switches for each of said keys, and simultaneously actuatable by the associated key;
   (e) a series of circuits respectively operative to couple said tone signal sources to said translating system by means of one of said plurality of switches, for producing an audible tone in response to actuation of the associated key;
   (f) a further series of circuits respectively interconnecting the other of said plurality of switches of the same-named musical notes, and operative to couple said tone signal sources to said translating system in a manner that simultaneous closing of said other switches in one circuit by actuation of both one solo and one accompaniment key will effect production of the tone signal related to said closed other switch of the solo key, such solo keys individually having means to close a series of said other switches in the octave immediately below each such solo key; and
   (g) a series of normally closed switches each responsive to actuation of one of said solo keys and respectively connected in said further series of circuits for preventing possible coupling through the associated one of said further series of circuits when the associated one of said normally closed switches is open.

8. An electrical musical instrument comprising in combination:
   (a) a series of tone signal sources having frequencies comprising a chromatic musical scale;
   (b) a translating system for converting tone signals into audible tones;
   (c) a series of solo keys and a series of accompaniment keys;
   (d) a plurality of normally open switches for each of said keys, and simultaneously acuatable by the associated key, each of the solo key switches having a movable element connected to one of said tone signal sources, and a contact normally engaged by said movable element;
   (e) a series of circuits respectively operative to couple said tone signal sources to said translating system by means of one of said normally open plurality of switches, for producing an audible tone in response to actuation of the associated key; and
   (f) a further series of circuits respectively interconnecting the other of said plurality of switches of the same-named musical notes, and operative to couple said tone signal sources by means of the normally engaged contacts to said translating system in a manner that simultaneous closing of said other switches in one circuit by actuation of both one solo and one accompaniment key will effect production of the tone signal related to said closed other switch of the solo key, such solo keys individually having means to close a series of said other switches in the octave immediately below each such solo key.

9. An electrical musical instrument comprising in combination:
   (a) a series of tone signal sources having frequencies comprising a chromatic musical scale;
   (b) a translating system for converting tone signals into audible tones;
   (c) a series of solo keys and a series of accompaniment keys;
   (d) a plurality of switches for each of said keys, and simultaneously actuatable by the associated key;

(e) a series of circuits respectively operative to couple said tone signal sources to said translating system by means of one of said plurality of switches, for producing an audible tone in response to actuation of the associated key;

(f) means operative to automatically sustain the audibility of the tone signals; and (g) a further series of circuits respectively including an electronic switch interconnecting the other of said plurality of switches of the same named musical note, and operative to couple said tone signal sources to said translating system in a manner that simultaneous closing of said other switches in one circuit by actuation of both one solo and one accompaniment key will effect production of the tone signal related to said closed other switch of the solo key, such solo keys individually having means to close a series of said other switches in the octave immediately below each such solo key.

10. An electrical musical instrument comprising in combination:

(a) a series of tone signal sources having frequencies comprising a chromatic musical scale;

(b) a translating system for converting tone signals into audible tones;

(c) a series of solo keys and a series of accompaniment keys;

(d) a plurality of switches for each of said keys, and simultaneously actuatable by the associated key;

(e) a series of circuits respectively operative to electronically couple said tone signal sources to said translating system by means of a first coupling potential conducted by one of said plurality of switches, for producing a normal audible tone in response to actuation of the associated key; and (f) a further series of circuits respectively interconnecting the other of said plurality of switches of the same-named musical notes, and operative to electronically couple said tone signal sources to said translating system by means of a selectable coupling potential in a manner that simultaneous closing of said other switches in one circuit by actuation of both one solo and one accompaniment key will effect production of the tone signal related to said closed other switch of the solo key at a selectable level of audibility, such solo keys individually having means to close a series of said other switches in the octave immediately below each such solo key.

11. An electrical musical instrument comprising in combination:

(a) a series of tone signal sources having frequencies comprising a chromatic musical scale;

(b) a translating system for converting tone signals into audible tones;

(c) a series of solo keys and a series of accompaniment keys;

(d) a plurality of switches for each of said keys, and simultaneously actuatable by the associated key;

(e) a series of circuits respectively operative to couple said tone signal sources to said translating system by means of one of said plurality of switches, for producing an audible tone in response to actuation of the associated key; and (f) a further series of circuits respectively interconnecting the other of said plurality of switches of the same-named musical notes, and operative to couple said tone signal sources to said translating system in a manner that simultaneous closing of said other switches in one circuit by actuation of both one solo and one accompaniment key will effect production of the tone signal related to said closed other switch of the solo key, said other switches of the solo keys being respectively related to tone signal sources in the octave immediately below said one solo key; one of said other switches for each of a number of adjacent solo keys having a fixed element in common with each other, and movable elements electrically connected together and respectively actuated by such adjacent solo keys.

12. An electrical musical instrument comprising in combination:

(a) a plurality of series of differently voiced tone signal sources, each series having frequencies comprising a chromatic musical scale;

(b) a translating system for converting tone signals into audible tones;

(c) a series of solo keys and a series of accompaniment keys, each mechanically operative to couple one of said tone signal sources of a selected voice electrically to said translating system; and (d) fill-in means responsive to simultaneous depression of any one of said solo keys and one or more of said accompaniment keys, and operative to electrically couple to said translating system one or more of said tone signal sources of different selected voicing pitched in the octave below said one solo key, said one or more tone signal sources being those which correspond in name to tones produced by said depressed one or more accompaniment keys.

13. Automatic fill-in means for a musical instrument having a series of jointly audible chromatic tone producing means activated by solo keys and by accompaniment keys, comprising:

(a) a series of switches respectively associated with each of said keys and actuatable thereby;

(b) a series of circuits respectively connecting the solo-key switches in electrical series with predetermined accompaniment-key switches, and respectively adapted to be connected in activating relation to said tone producing means; and (c) means adapted to be actuated by each of the solo keys for simultaneously closing a series of said solo-key switches in the octave below each said solo key; whereby the simultaneous playing of both a solo key and an accompaniment key will automatically produce an added note, corresponding to the note played on the accompaniment key, in the octave below the note played on the solo key.

14. A device according to claim 13 wherein each of said series of circuits includes a solenoid actuator for effecting said activating relation with the tone producing means.

15. Automatic fill-in means for a musical instrument having a series of jointly audible chromatic tone producing means activated by solo keys and by accompaniment keys, comprising:

(a) a series of switches adapted to be associated with said keys and to be actuated by playing thereof;

(b) a series of circuits respectively connecting the solo-key switches in electrical series with corresponding accompaniment-key switches, and respectively adapted to be connected in activating relation to said tone producing means; and (c) a series of switch actuator bars respectively adapted to be actuated by the solo keys for simultaneously closing a series of said solo-key switches in the octave below each said solo key; whereby the simultaneous playing of both a solo key and an accompaniment key will automatically produce an added note, corresponding to the note played on the accompaniment key, in the octave below the note played on the solo key.

16. Automatic fill-in means for a musical instrument having a series of jointly audible chromatic tone producing means activated by solo keys and by accompaniment keys, comprising:

(a) a series of switches respectively associated with each of said keys and actuatable thereby;

(b) a series of solenoid actuators adapted to have activating relation with the tone producing means;

(c) a series of circuits connected in parallel across a pair of power leads and respectively extending through the accompaniment-key switches to one side of said solenoid actuators, and from the other side of said solenoid actuators through lines serially connected with each other and including a predetermined musically-spaced pair of solo-key switches; and (d) said solo keys each having means operative to simultaneously isolate a series of said solenoid actuators in the octave below each said solo key and to connect said other sides thereof as a group to one of said power leads by actuating one of each of two of said pair of solo-key switches.

17. An electrical musical instrument comprising in combination:
   (a) a series of tone signal sources having frequencies comprising a chromatic scale;
   (b) a translating system for converting tone signals into audible tones;
   (c) a series of solo keys and a series of accompaniment keys corresponding to notes of the musical scale, and at least one of said series extending for more than one octave;
   (d) a plurality of switches for each of said keys, and simultaneously actuatable by the associated key;
   (e) a series of circuits respectively operatively coupling said tone signal sources to said translating system by means of one of said plurality of switches, for producing an audible tone in response to actuation of the associated key;
   (f) a further series of circuits respectively connecting together the other of said plurality of key-switches of said one series of keys which are related to the same-named musical notes, said further series of circuits also respectively connecting the other of said plurality of solo-key switches in electrical series with predetermined other of said plurality of accompaniment key switches;
   (g) circuit means respectively coupling said further series of circuits to said signal sources for effecting operative coupling thereof to said translating system;
   (h) means actuated by each of said solo keys for simultaneously closing a series of said other solo-key switches in the octave immediately below each said solo key; and
   (i) a line common to all of said further series of circuits and having a switch therein for controlling the delivery of electrical potential through said other key switches;
whereby the simultaneous playing of both a solo key and an accompaniment key will automatically produce an added note, corresponding to the note played on the accompaniment key, in the octave below the note played on the solo key.

18. An electrical musical instrument comprising in combination:
   (a) a series of tone signal sources having frequencies comprising a chromatic musical scale;
   (b) a translating system for converting tone signals into audible tones;
   (c) a series of solo keys and a series of accompaniment keys;
   (d) a plurality of normally open switches for each of said keys, and simultaneously actuatable by the associated key, each of the solo-key switches having a movable element connected to one of said tone signal sources, and a contact normally engaged by said movable element;
   (e) a series of circuits respectively operative to electronically couple said tone signal sources to said translating system by means of a first coupling potential conducted by one of said normally open plurality of switches, for producing a normal audible tone in response to actuation of the associated key;
   (f) means operative to automatically sustain the audibility of the tone signals; and
   (g) a further series of circuits respectively interconnecting other of said plurality of switches of the same-named musical notes, and operative to electronically couple said tone signal sources by means of the normally engaged contacts to said translating system by means of a selected coupling potential in a manner that simultaneous closing of said other switches in one circuit by actuation of both one solo and one accompaniment key will effect production of the tone signal related to said closed other switch of the solo key at a selectable level of audibility, said other switches of the solo keys being respectively related to tone signal sources in the octave immediately below said one solo key; one of said other switches for each of a number of adjacent solo keys having said contact as a fixed element in common with each other, and having said movable elements electrically connected together and respectively actuated by such adjacent solo keys;
whereby said solo keys individually have means to close a series of said other switches in the octave immediately below each such solo key.

19. An electrical musical instrument comprising in combination:
   (a) a series of tone signal sources having frequencies comprising a chromatic musical scale;
   (b) a translating system for converting tone signals into audible tones;
   (c) a series of solo keys and a series of accompaniment keys;
   (d) a plurality of switches for each of said keys, and simultaneously actuatable by the associated key;
   (e) a series of circuits respectively operative to couple said tone signal sources to said translating system by means of one of said plurality of switches, for producing an audible tone in response to actuation of the associated key;
   (f) means operative to automatically sustain the audibility of the tone signals; and
   (g) a further series of circuits interconnecting the other of said plurailty of switches of the same-named musical notes, and operative to couple said tone signal sources to said translating system in a manner that simultaneous closing of said other switches in one circuit by actuation of both one solo and one accompaniment key will effect production of the tone signal related to said closed other switch of the solo key, such solo keys individually having means to close a series of said other switches in the octave immediately below each such solo key, said further series of circuits having means for electrically isolating each such circuit from the others when accompaniment keys are played.

20. An electrical musical instrument comprising in combination:
   (a) a series of tone signal sources having frequencies comprising a chromatic musical scale;
   (b) a translating system for converting tone signals into audible tones;
   (c) a series of solo keys and a series of accompaniment keys corresponding to notes of the musical scale;
   (d) a series of switches respectively associated with each of said keys and actuatable thereby;
   (e) circuitry interconnecting the solo-key switches in electrical series with accompaniment switches and in coupling-effecting relation to said tone signal sources and said translating system; and
   (f) means actuated by each of said solo keys for isolating a closed series of said solo-key switches in the octave immediately below each said solo key;
whereby the simultaneous playing of both a solo key and an accompaniment key will automatically produce an added tone, corresponding to the tone played on the accompaniment key, in the octave below the tone played on the solo key.

21. In a musical instrument including a series of tone signal sources, left and right-hand key manuals for controlling said series of tone signal sources, and an output means, the combination comprising:
  (a) first means, responsive to the depression of tone-producing keys in said left-hand manual, for tentatively coupling to said output means corresponding ones of said signal sources normally under the control of said right-hand manual; and
  (b) second means responsive to the depression of a further single tone-producing key in said right-hand manual, for completing the coupling of said tentatively coupled corresponding signal sources simultaneously therewith to said output means.

References Cited by the Examiner

UNITED STATES PATENTS

| | | | |
|---|---|---|---|
| 2,422,940 | 6/1947 | Waage | 84—1.01 |
| 2,645,968 | 7/1953 | Hanert | 84—117 |
| 3,001,432 | 9/1961 | Greif | 84—1.01 |

DAVID J. GALVIN, *Primary Examiner.*